(12) United States Patent
Zheng et al.

(10) Patent No.: US 10,240,581 B2
(45) Date of Patent: Mar. 26, 2019

(54) SYSTEM AND METHOD FOR CONTROLLING PITCH ANGLE OF A WIND TURBINE ROTOR BLADE

(71) Applicant: General Electric Company, Schenectady, NY (US)

(72) Inventors: Sheng Jia Zheng, Simpsonville, SC (US); Mathew Doyle Angel, Atlanta, GA (US); Ziad Mohamed Amin, Alexandria (EG); Mahdi Hallak, Tazmalt (DZ)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 271 days.

(21) Appl. No.: 15/427,116

(22) Filed: Feb. 8, 2017

(65) Prior Publication Data

US 2018/0223803 A1    Aug. 9, 2018

(51) Int. Cl.
*F03D 7/04* (2006.01)
*F03D 7/02* (2006.01)

(52) U.S. Cl.
CPC ........... *F03D 7/0224* (2013.01); *F03D 7/026* (2013.01); *F05B 2270/328* (2013.01)

(58) Field of Classification Search
CPC ... F03D 7/0224; F03D 7/026; F05D 2270/328
USPC ....................................................... 416/120
See application file for complete search history.

(56) References Cited

U.S. PATENT DOCUMENTS

| 5,770,403 | A | 6/1998 | Dalie et al. |
| 7,592,711 | B1 | 9/2009 | Lee |
| 7,887,284 | B2 | 2/2011 | Merswolke et al. |
| 8,301,310 | B2 | 10/2012 | Nim |
| 8,478,449 | B2 | 7/2013 | Hernandez Mascarell |
| 9,249,779 | B2 | 2/2016 | Bjerge et al. |
| 9,759,068 | B2* | 9/2017 | Herrig ................... F03D 7/0224 |
| 2007/0057517 | A1* | 3/2007 | McNerney ............ F03D 7/0224 290/44 |
| 2010/0133819 | A1* | 6/2010 | Kinzie .................. F03D 7/0224 290/44 |

(Continued)

FOREIGN PATENT DOCUMENTS

| CN | 101054951 | 10/2007 |
| CN | 101363405 | 2/2009 |

(Continued)

*Primary Examiner* — Hai H Huynh
(74) *Attorney, Agent, or Firm* — Dority & Manning, PA (57) ABSTRACT

The present disclosure is directed to a method for controlling a pitch angle of a rotor blade of a wind turbine. The method includes adjusting, with an actuator, the pitch angle of the rotor blade during a start-up sequence of the wind turbine. The actuator adjusts the pitch angle of the rotor blade by rotating the rotor blade about a pitch axis relative to a hub. The method also includes determining, with a controller, a minimum pitch angle threshold of the rotor blade based on a tip speed ratio of the rotor blade. The method further includes comparing, with the controller, a current pitch angle of the rotor blade to the minimum pitch angle threshold. When the pitch angle meets the minimum pitch angle threshold, the method includes preventing, with the actuator, the pitch angle of the rotor blade from exceeding the minimum pitch angle threshold.

20 Claims, 5 Drawing Sheets

(56) References Cited

U.S. PATENT DOCUMENTS

| | | | |
|---|---|---|---|
| 2013/0193686 A1* | 8/2013 | Perley | F03D 7/0224 290/44 |
| 2013/0243590 A1* | 9/2013 | Edenfeld | F03D 7/0224 416/1 |
| 2014/0017081 A1* | 1/2014 | Esbensen | F03D 7/0224 416/1 |
| 2014/0028025 A1* | 1/2014 | Ibendorf | F03D 7/0224 290/44 |
| 2014/0356161 A1* | 12/2014 | Creaby | F03D 7/0224 416/1 |
| 2015/0226183 A1* | 8/2015 | Esbensen | F03D 7/0224 290/44 |
| 2015/0300319 A1* | 10/2015 | Pedersen | F03D 7/026 416/1 |
| 2015/0337802 A1* | 11/2015 | Su | F03D 7/0224 416/1 |
| 2015/0354534 A1 | 12/2015 | Pineda Amo | |
| 2016/0186722 A1* | 6/2016 | Olesen | F03D 17/00 416/1 |
| 2016/0230741 A1 | 8/2016 | Brath et al. | |
| 2017/0082090 A1* | 3/2017 | Barton | F03D 7/0224 |
| 2018/0187647 A1* | 7/2018 | Perley | F03D 7/0224 |
| 2018/0283352 A1* | 10/2018 | Williams | F03D 17/00 |
| 2018/0320659 A1* | 11/2018 | Zinnecker | F03D 7/0224 |

FOREIGN PATENT DOCUMENTS

| | | |
|---|---|---|
| KR | 101304916 B1 | 8/2013 |
| KR | 101387747 B1 | 10/2013 |
| WO | WO 2009/082326 A1 | 7/2009 |

* cited by examiner

SYSTEM AND METHOD FOR CONTROLLING PITCH ANGLE OF A WIND TURBINE ROTOR BLADE

FIELD

The present disclosure generally relates to wind turbines. More particularly, the present disclosure relates to systems and methods for controlling pitch angles of wind turbine rotor blades.

BACKGROUND

Wind power is considered one of the cleanest, most environmentally friendly energy sources presently available, and wind turbines have gained increased attention in this regard. A modern wind turbine typically includes a tower, a nacelle mounted on the tower, a generator positioned in the nacelle, and a rotor having one or more rotor blades coupled to a hub. The rotor blades convert kinetic energy of wind into mechanical energy using known airfoil principles. A drivetrain transmits the mechanical energy from the rotor blades to the generator. The generator then converts the mechanical energy to electrical energy that may be supplied to a utility grid.

The rotor blades may be rotatably coupled to the hub. In this respect, pitch adjustment mechanisms may rotate the rotor blades relative to the hub to adjust a pitch angle of the rotor blades. For example, the pitch adjustment mechanisms may adjust the pitch angle of the rotor blades during a start-up sequence of the wind turbine. However, when the rotor blades fall below a minimum pitch angle during the start-up sequence, the rotor blades may experience negative stall.

Conventional systems and methods for controlling the pitch angle of the rotor blades during the start-up sequence of the wind turbine may require multiple start-up sequence attempts before the wind turbine is able to generate power. More specifically, conventional systems and methods may initiate a start-up sequence when the wind turbine experiences a wind speed sufficient to power the generator. Once the start-up sequence is initiated, the pitch adjustment mechanisms may adjust the pitch angle of the rotor blades at a predetermined rate. However, the wind speed experienced by the rotor blades may change during the start-up sequence. A change in wind speed may, for example, cause the rotor blades fall below the minimum pitch angle and experience negative stall. When negative stall occurs, the systems and methods must stop and reinitiate the start-up sequence of the wind turbine. In certain instances, this may occur multiple times before the wind turbine is able to produce power. In this respect, multiple start-up sequence attempts may cause significant wear to the pitch adjustment mechanisms and other wind turbine components.

Accordingly, improved wind turbines, and, in particular, improved systems and methods for controlling the pitch angle of wind turbine rotor blades, are desired in the art. Specifically, systems and methods that do not require multiple start-up attempts and produce relatively less wear on the wind turbine would be advantageous.

BRIEF DESCRIPTION

Aspects and advantages of the technology will be set forth in part in the following description, or may be obvious from the description, or may be learned through practice of the technology.

In one embodiment, the present disclosure is directed to a method for controlling a pitch angle of a rotor blade of a wind turbine. The method includes adjusting, with an actuator, the pitch angle of the rotor blade during a start-up sequence of the wind turbine. The actuator adjusts the pitch angle of the rotor blade by rotating the rotor blade about a pitch axis relative to a hub. The method also includes determining, with a controller, a minimum pitch angle threshold of the rotor blade based on a tip speed ratio of the rotor blade. The method further includes comparing, with the controller, a current pitch angle of the rotor blade to the minimum pitch angle threshold. When the pitch angle meets the minimum pitch angle threshold, the method includes preventing, with the actuator, the pitch angle of the rotor blade from exceeding the minimum pitch angle threshold.

In another embodiment, the present disclosure is directed to a system for controlling a pitch angle of a rotor blade of a wind turbine. The system includes a rotor having a hub and a rotor blade. The system also includes an actuator that adjusts the pitch angle of the rotor blade by rotating the rotor blade about a pitch axis relative to the hub. The system further includes a controller communicatively coupled to the actuator. The controller is configured to control the actuator to adjust the pitch angle of the rotor blade to move the rotor during a start-up sequence of the wind turbine. The controller is also configured to determine a minimum pitch angle threshold of the rotor blade based on a tip speed ratio of the rotor blade. The controller is further configured to compare a current pitch angle of the rotor blade to the minimum pitch angle threshold. When the pitch angle meets the minimum pitch angle threshold, the controller is also configured to control the actuator to prevent the pitch angle of the rotor blade from exceeding the minimum pitch angle threshold.

In a further embodiment, the present disclosure is directed to a wind turbine that includes a tower, a nacelle mounted on the tower, and a rotor coupled to the nacelle. The rotor includes a hub and at least one rotor blade extending from the hub. An actuator adjusts the pitch angle of the rotor blade by rotating the rotor blade about a pitch axis relative to the hub. A controller is communicatively coupled to the actuator. The controller is configured to control the actuator to adjust the pitch angle of the rotor blade during a start-up sequence of the wind turbine. The controller is also configured to determine a minimum pitch angle threshold of the rotor blade based on a tip speed ratio of the rotor blade. The controller is further configured to compare a current pitch angle of the rotor blade to the minimum pitch angle threshold. When the pitch angle meets the minimum pitch angle threshold, the controller is configured to control the actuator to prevent the pitch angle of the rotor blade from exceeding the minimum pitch angle threshold.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended FIGS., in which.

Repeat use of reference characters in the present specification and drawings is intended to represent the same or analogous features or elements of the present technology.

DETAILED DESCRIPTION

Reference will now be made in detail to present embodiments of the technology, one or more examples of which are illustrated in the accompanying drawings. The detailed description uses numerical and letter designations to refer to features in the drawings. Like or similar designations in the drawings and description have been used to refer to like or similar parts of the technology. As used herein, the terms "first", "second", and "third" may be used interchangeably to distinguish one component from another and are not intended to signify location or importance of the individual components.

Each example is provided by way of explanation of the technology, not limitation of the technology. In fact, it will be apparent to those skilled in the art that modifications and variations can be made in the present technology without departing from the scope or spirit thereof. For instance, features illustrated or described as part of one embodiment may be used on another embodiment to yield a still further embodiment. Thus, it is intended that the present technology covers such modifications and variations as come within the scope of the appended claims and their equivalents.

Figure 1:
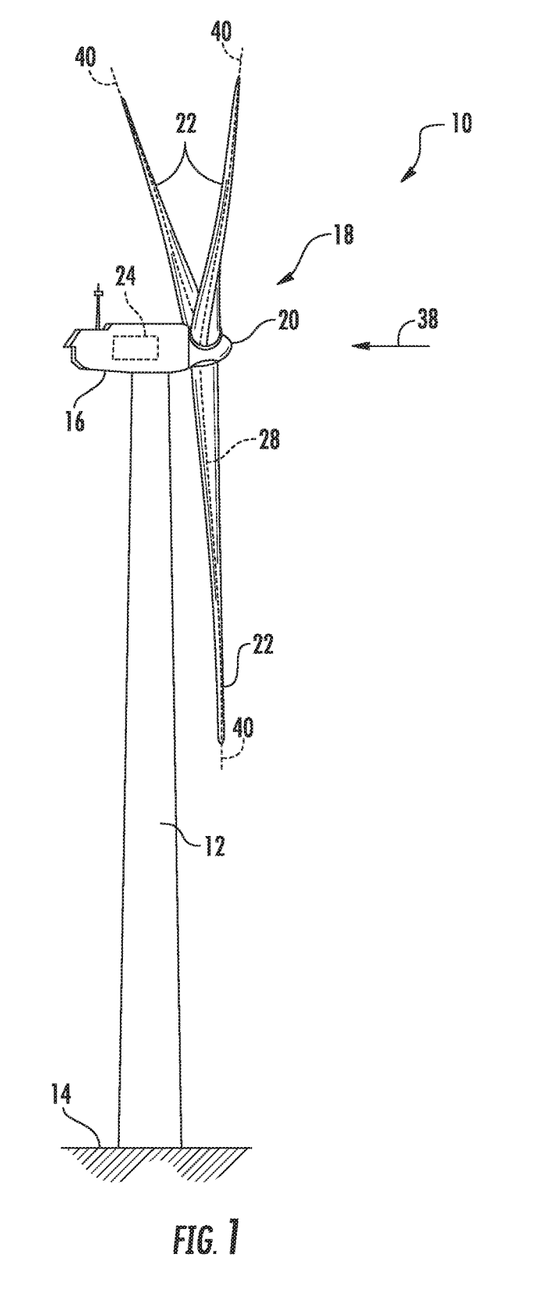
FIG. 1 is a perspective view of a wind turbine according to one embodiment of the present disclosure.

Referring now to the drawings, FIG. 1 illustrates a perspective view of one embodiment of an exemplary wind turbine 10 in accordance with the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outward from the hub 20. For example, in the embodiment shown in FIG. 1, the rotor 18 includes three rotor blades 22. In alternative embodiments, however, the rotor 18 may include more or less than three rotor blades 22. Each rotor blade 22 may be spaced about the hub 20 to facilitate rotating the rotor 18 to convert kinetic energy from the wind into usable rotational, mechanical energy. A generator 24 positioned in the nacelle 16 may generate electrical power from the rotational energy of the rotor 18.

Figure 2:
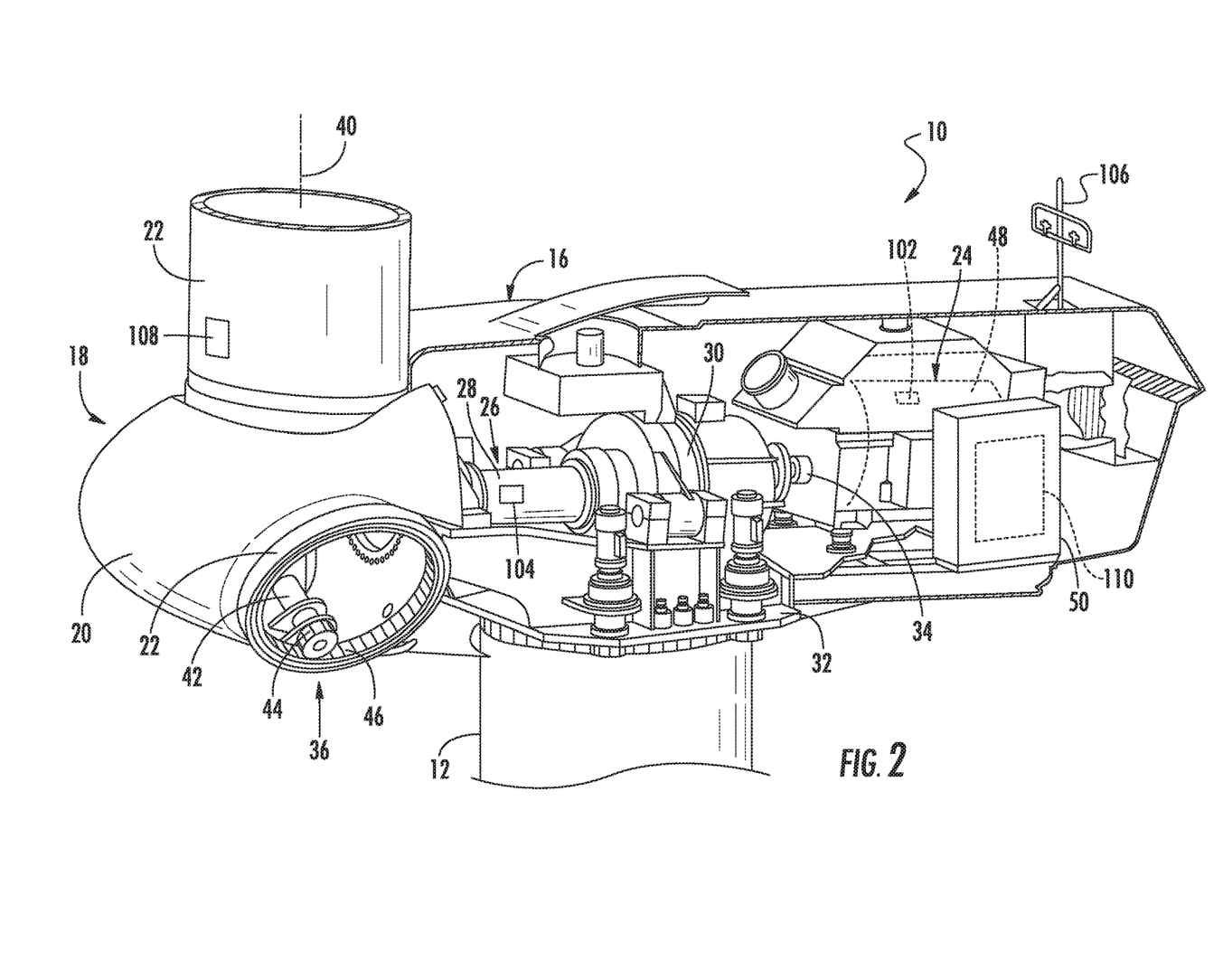
FIG. 2 is a perspective, internal view of a nacelle of a wind turbine according to one embodiment of the present disclosure.

Referring now to FIG. 2, a drivetrain 26 rotatably couples the rotor 18 to the electric generator 24. As shown, the drivetrain 26 may include a rotor shaft 28 that rotatably couples the hub 20 of the rotor 18 to a gearbox 30. The gearbox 30 may be supported by and coupled to a bedplate 32 in the nacelle 16. The drivetrain 26 may also include a generator shaft 34 that rotatably couples the gearbox 30 to the generator 24. In this respect, rotation of the rotor 18 drives the generator 24. More specifically, the rotor shaft 28 may provide a low speed, high torque input to the gearbox 30 in response to rotation of the rotor blades 22 and the hub 20. The gearbox 30 may then convert the low speed, high torque input to a high speed, low torque output to drive the generator shaft 34 and, thus, the generator 24. In alternate embodiments, however, the generator 24 may be directly rotatably coupled to the rotor shaft 28 in a direct-drive configuration.

The wind turbine 10 may also include one or more pitch adjustment mechanisms 36. Although FIG. 2 only illustrates one pitch adjustment mechanism 36, the wind turbine 10 may include three pitch adjustment mechanisms 36. In this respect, the wind turbine 10 may include one pitch adjustment mechanism 36 for each rotor blade 22. In alternate embodiments, however, the wind turbine 10 may include more or fewer pitch adjustment mechanisms 36.

Each pitch adjustment mechanism 36 may adjust a pitch angle of the corresponding rotor blade 22 (i.e., the angular orientation of the rotor blade 22 with respect to a direction 38 of the wind). In particular, each rotor blade 22 may be rotatably coupled to the hub 20 by a pitch bearing (not shown). As such, each pitch adjustment mechanism 36 may rotate one of the rotor blades 22 about a corresponding pitch axis 40 (FIG. 1) relative to the hub 20, thereby adjusting the pitch angle of the rotor blade 22.

FIG. 2 illustrates an exemplary embodiment of one of the pitch adjustment mechanisms 36. More specifically, the pitch adjustment mechanism 36 may include an electric motor 42 having a pinion gear 44 coupled thereto. The pinion gear 44 may engage a plurality of teeth 46 formed on or coupled to an inner surface of the rotor blade 22. During operation of the pitch adjustment mechanism 36, the electric motor 42 rotates the pinion gear 44, which rotates the rotor blade 22 about the corresponding pitch axis 40. In alternate embodiments, the pitch adjustment mechanism 36 may include any suitable type of actuator and/or any suitable structure or mechanism for transmitting the movement of the actuator to the rotor blade 22.

Figure 3:
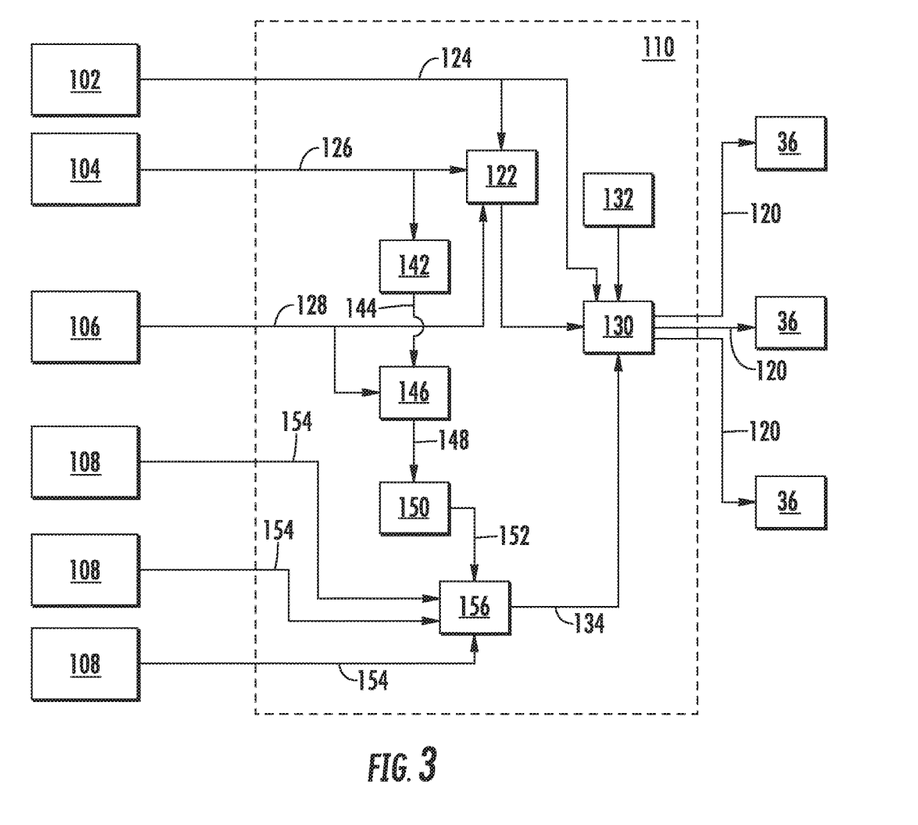
FIG. 3 is a schematic view of a system for controlling a pitch angle of a rotor blade of a wind turbine according to one embodiment of the present disclosure.

FIG. 3 illustrates a system 100 for controlling the pitch angle of the rotor blades 22 of the wind turbine 10. As will be discussed in greater detail below, the system 100 controls the pitch angle of the rotor blades 22 during a start-up sequence of the wind turbine 10 to prevent the rotor blades 22 from stalling. The start-up sequence occurs when the wind turbine 10 transitions from non-power producing state (i.e., the generator 24 does not produce electricity) to a power producing state (i.e., the generator 24 produces electricity).

As shown in FIG. 3, the system 100 may include a generator speed sensor 102 that detects a generator speed of the generator 24 (i.e., the rotational speed of a generator rotor 48 of the generator 24). In this respect, the generator speed sensor 102 may be operatively coupled to a generator rotor 48 as shown in FIG. 2. In alternate embodiments, the generator speed sensor 102 may be operatively coupled to the generator shaft 34. The generator speed sensor 102 may be a Hall Effect sensor or any other suitable type of sensor for measuring rotational position or speed.

Referring again to FIG. 3, the system 100 may also include a rotor speed sensor 104 that detects a rotor speed of the rotor shaft 24 (i.e., the rotational speed of the rotor shaft 24). In this respect, the rotor speed sensor 104 is operatively coupled to a rotor shaft 28 as shown in FIG. 2. The rotor speed sensor 104 may be a Hall Effect sensor or any other suitable type of sensor for measuring rotational position or speed.

The system 100 may further include a wind speed sensor 106 as shown in FIG. 3. In particular, the wind speed sensor 106 detects a wind speed experienced by the wind turbine 10 and, more particularly, the rotor blades 22. As shown in FIG. 2, the wind speed sensor 106 is mounted to the exterior of the nacelle 16. The wind speed sensor 106 may be an anemometer, a wind vane, or any other suitable type of sensor for measuring wind speed.

The system 100 also includes one or more pitch angle sensors 108. In the embodiment shown in FIG. 3, the system 100 includes three pitch angle sensors 108. In this respect, the wind turbine 10 may include one pitch angle sensor 108 for each rotor blade 22. In alternate embodiments, however, the wind turbine 10 may include more or fewer pitch angle sensors 108. Each pitch angle sensor 108 detects the pitch angle of the corresponding rotor blade 22. As shown in FIG. 2, each pitch angle sensor 108 is operatively coupled to one of the rotor blades 22. The pitch angle sensor 108 may be a Hall Effect sensor or any other suitable type of sensor for measuring rotational position or speed.

Referring again to FIG. 3, the system 100 includes a controller 110 communicatively coupled to one or more components of the system 100 and/or the wind turbine 10, such as the sensors 102, 104, 106, 108 and the pitch adjustment mechanisms 36. In the embodiment shown in FIG. 2, for example, the controller 110 is disposed within a control cabinet 50 mounted to a portion of the nacelle 16. In alternate embodiments, however, the controller 110 may be disposed at any location on or in the wind turbine 10, at any location on the support surface 14, or any other suitable location.

Figure 4:
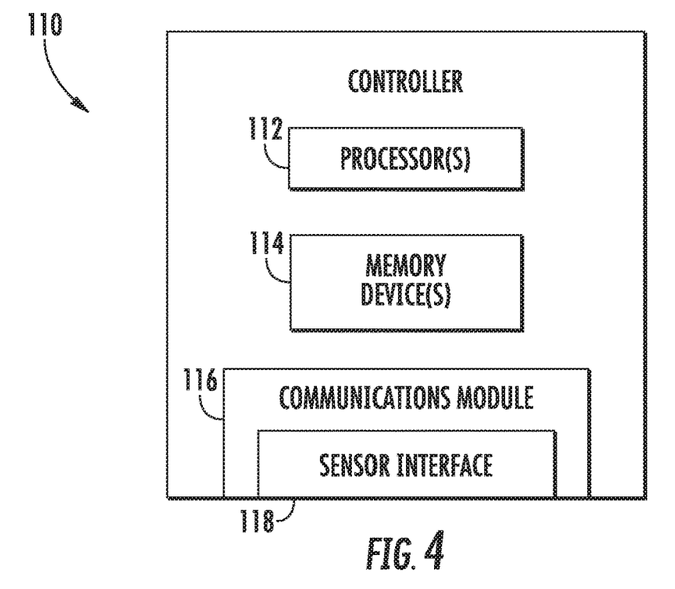
FIG. 4 is a schematic view of a controller of a system for controlling a pitch angle of a rotor blade of a wind turbine according to one embodiment of the present disclosure.

In general, the controller 110 may correspond to any suitable processor-based device, including one or more computing devices. As shown in FIG. 4, for example, the controller 110 may include one or more processors 112 and one or more associated memory devices 114 configured to perform a variety of computer-implemented functions (e.g., performing the methods, steps, calculations, and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory devices 114 may generally include memory element(s) including, but not limited to, a computer readable medium (e.g., random access memory (RAM)), a computer readable non-volatile medium (e.g., flash memory), a compact disc-read only memory (CD-ROM), a magneto-optical disk (MOD), a digital versatile disc (DVD), and/or other suitable memory elements or combinations thereof. The memory device 114 may store instructions that, when executed by the processor 112, cause the processor 112 to perform functions (e.g., the method described herein).

The controller 110 may also include a communications module 116 to facilitate communications between the controller 110 and the various components of the system 100 and/or the wind turbine 10. For example, the communications module 116 may permit the controller 110 to receive data from the sensors 102, 104, 106, 108. As such, the communications module 116 may include a sensor interface 118 (e.g., one or more analog-to-digital converters) that converts the signals received from the sensors 102, 104, 106, 108 into signals that can be understood and processed by the processors 112. Furthermore, the communications module 116 may permit the controller 110 to transmit control signals to each pitch adjustment mechanism 36 for controlling the pitch angle of the rotor blades 22. In this respect, the communications module 116 may be any combination of suitable wired and/or wireless communication interfaces that communicatively couple the sensors 102, 104, 106, 108 and the pitch adjustment mechanisms 36 to the controller 110.

As mentioned above, the system 100 controls the pitch angles of the rotor blades 22 during the start-up sequence of the wind turbine 10. More specifically, during the start-up sequence, the pitch adjustment mechanisms 36 adjust the pitch angle of the rotor blades 22 to move the rotor blades 22, such as from a first position to a second position, based on control signals from the controller 110. In an exemplary embodiment, the first position may correspond to a feathered position. In the feathered position, the pitch angle of the rotor blades 22 prevents the rotor blades 22 from producing sufficient lift to power the generator 24. As such, the generator 24 does not produce electric power when the rotor blades 22 are in the feathered position. Furthermore, in the exemplary embodiment, the second position may correspond to a power position. In the power position, the pitch angle of the rotor blades 22 allows the rotor blades 22 to generate sufficient lift to power the generator 24. As such, the generator 24 produces electric power when the rotor blades 22 are in the power position. In alternate embodiments, however, the first and second positions may correspond to any suitable positions between which the rotor blades 22 may move during the start-up sequence.

Referring again to FIG. 3, the controller 110 may be configured to control the pitch adjustment mechanisms 136 by executing various logic stored on the memory device(s) 114. In particular, the controller 110 (e.g., via the processor(s) 112) executes the logic to create control signals 120 based the data received from the sensors 102, 104, 106, 108. Using the control signals 120, the pitch adjustment mechanisms 36 adjust the pitch angles of the rotor blades 22 in a manner that prevents the rotor blades 22 from stalling while moving during the start-up sequence. The controller 110 may control each pitch adjustment mechanism 36 individually (i.e., the control signals 120 may be different for each pitch adjustment mechanism 36) in some embodiments. In alternate embodiments, the controller 110 may control all of pitch adjustment mechanisms 36 as a collective unit (i.e., the control signals 120 may be the same for each pitch adjustment mechanism 36).

In some embodiments, the controller 110 may be configured to determine when the wind turbine 10 should initiate the start-up sequence. As mentioned above, the controller 110 is communicatively coupled to the generator speed sensor 102, the rotor speed sensor 104, and the wind speed sensor 106. In this respect, the controller 110 respectively receives a generator speed signal 124, a rotor speed signal 126, and a wind speed signal 128 from the sensors 102, 104, 106. As shown in FIG. 3, the controller 110 may include start-up sequence logic 122 having one or more mathematical functions and/or one or more look-up tables. By executing the start-up sequence logic 122, the controller 110 may determine when the generator speed, rotor speed, and/or wind speed meet certain threshold values. These threshold values may indicate that the wind turbine 10 is experiencing weather conditions suitable for power generation (e.g., wind speeds sufficient to power the generator 24). In alternate embodiments, the start-up sequence logic 122 may use any suitable methodology or criteria to determine when to initiate the start-up sequence.

When the controller 110 determines that the wind turbine 10 should initiate the start-up sequence, the controller 110 is configured to generate the control signals 120. As mentioned above, the control signals 120 may instruct the pitch adjustment mechanisms 36 to change the pitch angle of the corresponding rotor blade 22 to move the rotor blades 22 during the start-up sequence. As shown in FIG. 3, the controller 110 may include pitch adjustment logic 130 having one or more mathematical functions and/or one or more look-up tables. By executing the pitch adjustment logic 130, the controller 110 may generate the control signals 120 based the generator speed (i.e., the generator speed signal 124) and/or a predetermined ramp rate 132 for the generator speed. The ramp rate 132 may be a desired acceleration of the generator rotor 48 while transitioning from a non-power generating state to a power generating state during the start-up sequence. In particular embodiments, the ramp rate 132 may be a fixed value. In alternate embodiments, however, the ramp rate 132 may be a range of values. Furthermore, the control signals 120 may also be based on a clamp signal 134 in certain instances. As will be discussed in greater detail below, the clamp signal 134 prevents pitch adjustment mechanisms 36 from moving the rotor blades 22 in a manner that would cause the rotor blades 22 to negatively stall during the start-up sequence.

When the controller 110 determines that the wind turbine 10 should not initiate the start-up sequence, the controller 110 may execute the start-up sequence logic 122 again. In certain embodiments, the controller 110 may execute the start-up sequence logic 122 after a certain time period has expired.

Figure 5:
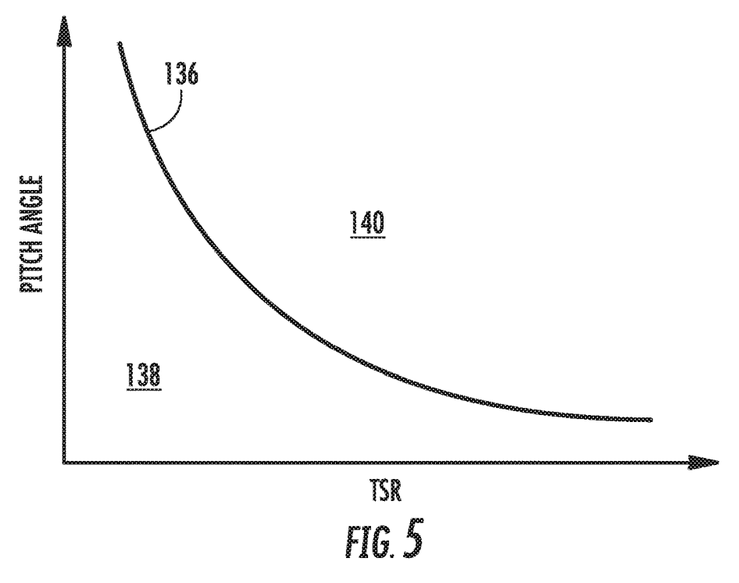
FIG. 5 is a chart illustrating a minimum pitch angle threshold of a wind turbine according to one embodiment of the present disclosure.

As discussed above, the pitch adjustment mechanisms 36 adjust the pitch angles of the rotor blades 22 to move the rotor blades 22 during the start-up sequence. Referring now to FIG. 5, the rotor blades 22 may include a minimum pitch angle threshold 136. As shown, the minimum pitch angle threshold 136 is a function to the tip speed ratio of the rotor blades 22. The tip speed ratio (TSR) is the ratio of the tip speed of the rotor blades 22 to the wind speed of the wind experienced by the rotor blades 22. When the pitch angle of the rotor blades 22 exceeds (i.e., falls below) the minimum pitch angle threshold 136, the rotor blades 22 may enter a negative stall zone 138 and experience negative stall. The system 100 must terminate and then reinitiate the start-up sequence when the rotor blades 22 negatively stall. As such, the pitch angle of the rotor blades 22 should be at or above the minimum pitch angle threshold 136 (i.e., in an operating zone 140) during the start-up sequence.

Referring again to FIG. 3, the controller 110 may be configured to determine the tip speed ratio of the rotor blades 22. As mentioned above, the controller 110 receives the rotor speed signal 126, which is indicative of the rotor speed of the rotor shaft 28, and the wind speed signal 128. In this respect, the controller 110 may include tip speed logic 142 having one or more mathematical functions and/or one or more look-up tables. By executing the tip speed logic 142, the controller 110 may convert the rotor speed signal 126 into a tip speed signal 144 indicative of a tip speed of the rotor blades 22. The controller 110 may also include tip speed ratio logic 146 having one or more mathematical functions and/or one or more look-up tables. By executing the tip speed ratio logic 146, the controller 110 may convert the tip speed signal 144 and the wind speed signal 128 into a tip speed ratio signal 148 indicative of a tip speed ratio of the rotor blades 22. In certain embodiments, the controller 110 may execute the tip speed ratio logic 146 to convert the rotor speed signal 126 and the wind speed signal 128 into the tip speed ratio signal 148. In such embodiments, the tip speed logic 142 is not necessary.

Once the controller 110 determines the tip speed ratio (i.e., the tip speed ratio signal 148), the controller 110 may be configured to determine the minimum pitch angle threshold 136 (FIG. 5) for the rotor blades 22. In this respect, the controller 110 may include minimum pitch angle threshold logic 150. By executing the minimum pitch angle threshold logic 150, the controller 110 may generate a minimum pitch angle threshold signal 152 indicative of the minimum pitch angle threshold 136 based on the tip speed ratio signal 148.

In some embodiments, the minimum pitch angle logic 150 may include a look-up table comprising a first table of values and a second table of values. Each value in the first table may correspond to the tip speed ratio. Similarly, each value in the second table may correspond to the minimum pitch angle threshold 136 (FIG. 5). As such, the controller 110 may, when executing the minimum pitch angle threshold logic 150, select a first value from the first table of values based on the tip speed ratio signal 148. The controller 110 may then determine the corresponding value for the minimum pitch angle threshold 136 from the second table based on the selected first value. In alternate embodiments, however, the minimum pitch angle threshold logic 150 may include one or more mathematical functions for calculating the minimum pitch angle threshold 136 based on the tip speed ratio.

The controller 110 may be configured to compare a current pitch angle of the rotor blades 22 to the minimum pitch angle threshold 136. As mentioned above, the controller 110 is communicatively coupled to the pitch angle sensors 108. In the embodiment shown in FIG. 3, the controller 110 is communicatively coupled to three pitch angle sensors 108. In alternate embodiments, the controller 110 may be communicatively coupled to more or fewer pitch angle sensors 108. For example, the controller 110 may be coupled to only one pitch angle sensor 108 if the system 100 adjusts all of pitch adjustment mechanisms 36 as a collective unit. The controller 110 receives a pitch angle signal 154 from each of the sensors 108. As shown in FIG. 3, the controller 110 may include clamping logic 156 having one or more mathematical functions and/or one or more look-up tables. By executing the clamping logic 156, the controller 110 may determine when the current pitch angle of the rotor blades 22 (i.e., via the pitch angle signal(s) 154) meets the minimum pitch angle threshold 136.

When the current pitch angle of the rotor blades 22 meets the minimum pitch angle threshold 136, the controller 110 generates the clamp signal 134. As mentioned above, the controller 110 may execute the pitch adjustment logic 130 to generate the control signals 120 to adjust the pitch angles of the rotor blades 22 during the start-up sequence. When the clamp signal 134 is present, the controller 110, when executing the pitch adjustment logic 130, generates the control signals 120 such the pitch angles of the rotor blades 22 do not exceed the minimum pitch angle threshold 136 (i.e., enter into the negative stall zone 138 shown in FIG. 5). In certain embodiments, the controls signals 120 may instruct the pitch adjustment mechanisms 36 to adjust the pitch angles of the rotor blades 22 such that the current pitch angle of the rotor blades 22 meets the minimum pitch angle threshold 136 for the remainder of the start-up sequence. That is, the pitch adjustment mechanisms 36 may maintain the current pitch angles of the rotor blades 22 at the minimum pitch angle threshold 136 once the controller 110 generates the clamp signal 134. In alternate embodiments, the current pitch angles of the rotor blades 22 may be permitted to move away from the minimum pitch angle threshold 136 and into the operating zone 140 shown in FIG. 5 after the controller 110 generates the clamp signal 134.

When the current pitch angle of the rotor blades 22 is above the minimum pitch angle threshold 136 (i.e., in the operating zone 140 shown in FIG. 5), the controller 110 does not generate the clamp signal 134. In this respect, the controller 110, when executing the pitch adjustment logic 130, generates the control signals 120 based the generator speed signal 124 and/or a predetermined ramp rate 132.

In certain embodiments, the controller 110 is configured to determine the tip speed ratio and the minimum pitch angle threshold 136 a plurality of times during the start-up sequence. Furthermore, the controller 110 may be configured to compare the current pitch angle of the rotor blades 22 to the minimum pitch angle threshold 136 a plurality of times during the start-up sequence. In particular embodiments, the controller 110 may be configured to compare the current pitch angle of the rotor blades 22 to the minimum pitch angle threshold 136 each time the minimum pitch angle threshold 136 is determined.

Figure 6:
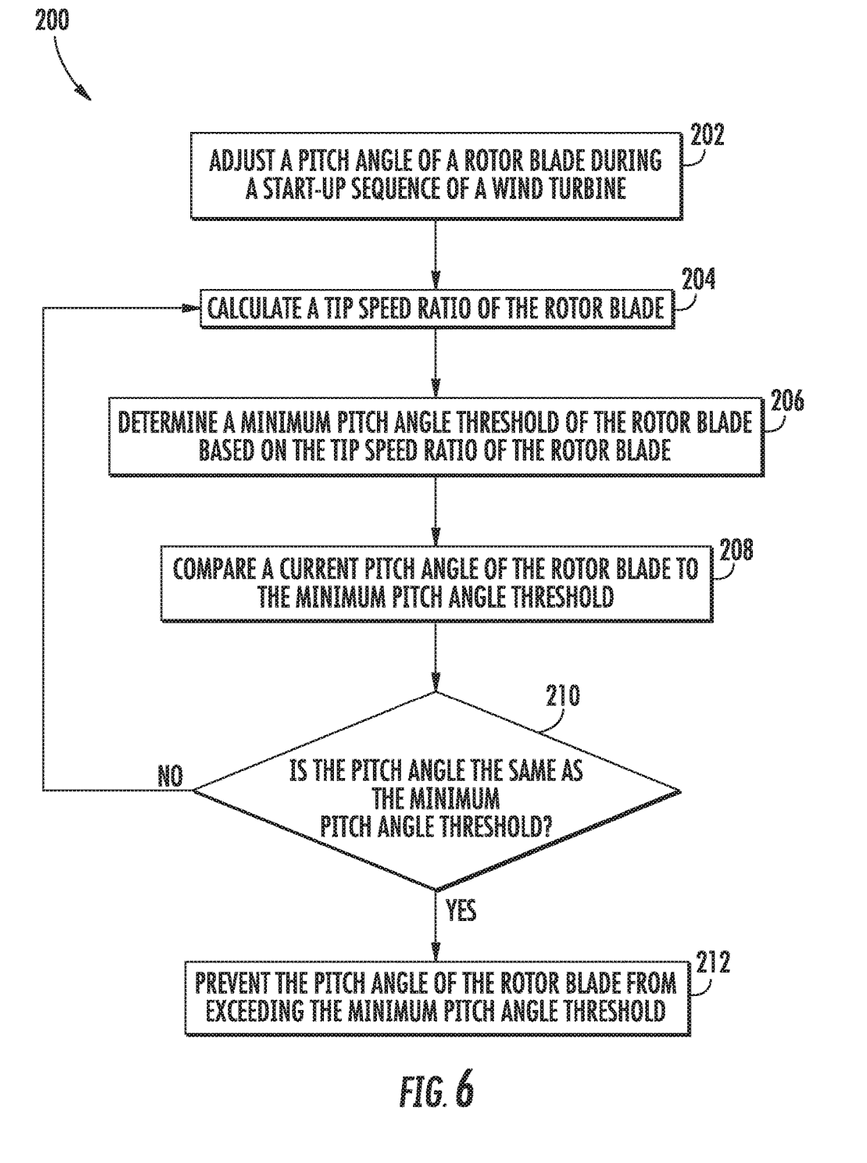
FIG. 6 is a flow chart illustrating a method for controlling a pitch angle of a rotor blade of a wind turbine according to one embodiment of the present disclosure.

FIG. 6 illustrates a method 200 for controlling the pitch angle of the rotor blades 22 of the wind turbine 10 in accordance with embodiments of the present disclosure.

In step 202, the pitch angle of the rotor blades 22 may be adjusted during the start-up sequence of the wind turbine 10. For example, the pitch adjustment mechanisms 36 may adjust to the pitch angle of the rotor blades 22 to move the rotor blades 22 from the first position to the second position. As mentioned above, in certain embodiments, the first position may be the feathered position and the second position may be the power position.

In step 204, the tip speed ratio of the rotor blades 22 may be calculated. For example, the controller 110 may execute logic (e.g., the tip speed logic 142 and/or the tip speed ratio logic 146) to generate the tip speed ratio signal 148 based on the rotor speed signal 126 and the wind speed signal 128.

In step 206, the minimum pitch angle threshold 136 of the rotor blades 22 may be determined. For example, the controller 110 may execute logic (e.g., the minimum pitch angle threshold logic 150) to generate the minimum pitch angle threshold signal 152 based on the tip speed ratio of the rotor blade 22. As discussed in greater detail above, the logic may include one or more look-up tables and/or one or more mathematical functions.

In step 208, the current pitch angle of the rotor blades 22 is compared to the minimum pitch angle threshold 136. For example, the controller 110 may execute logic (e.g., the clamping logic 156) to compare the current pitch angles and the minimum pitch angle threshold 136.

In step 210, it is determined when the current pitch angle is the same as the minimum pitch angle threshold 136. For example, the controller 110 may execute logic (e.g., the clamping logic 156) to determine when the current pitch angle is the same as (i.e., meets) the minimum pitch angle threshold 136. When the current pitch angle is not the same as the minimum pitch angle threshold 136 (i.e., is in the operating zone 140), the method 200 may include repeating steps 204-210.

When the current pitch angle is the same as the minimum pitch angle threshold 136, the pitch angle of the rotor blades 22 is prevented from exceeding (i.e., dropping below) the minimum pitch angle threshold 136 in step 212. For example, the controller 110 may execute logic (e.g., the pitch adjustment logic 130) to generate controls signals 120 that control the pitch adjustment mechanisms 36 in a manner such that the pitch angle of the rotor blades 22 does not exceed the minimum pitch angle threshold 136. As mentioned above, the pitch angle may be maintained at the minimum pitch angle threshold 136 for the remainder of the start-up sequence in some embodiments. In alternate embodiments, however, the pitch angle may be permitted to move away from the minimum pitch angle threshold 136 and into the operating zone 140.

As discussed above, the system 100 and the method 200 disclosed herein prevent the pitch angle of the rotor blades 22 from exceeding a minimum pitch angle threshold 136. More specifically, the system 100 and the method 200 may adjust the pitch angle of the rotor blades 22 to move the rotor blades 22 during the start-up sequence based on the predetermined ramp rate 132. During the start-up sequence, the wind speed experienced by the wind turbine 10 may change, thereby causing a change in the tip speed ratio of the rotor blades 22. In such instances, the system 100 and the method 200 may deviate from the predetermined ramp rate 132 to prevent the current pitch angle from exceeding the minimum pitch angle threshold 136. In this respect, the system 100 and the method 200, unlike conventional systems and methods, do not require multiple start-up sequence attempts before the generator 24 is able to produce power. As such, the system 100 and the method 200 create less wear on the wind turbine 10 than conventional systems and methods.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method for controlling a pitch angle of a rotor blade of a wind turbine, the method comprising:
   adjusting, with an actuator, the pitch angle of the rotor blade during a start-up sequence of the wind turbine, wherein the actuator adjusts the pitch angle of the rotor blade by rotating the rotor blade about a pitch axis relative to a hub;
   determining, with a controller, a minimum pitch angle threshold of the rotor blade based on a tip speed ratio of the rotor blade;
   comparing, with the controller, a current pitch angle of the rotor blade to the minimum pitch angle threshold; and
   when the pitch angle meets the minimum pitch angle threshold, preventing, with the actuator, the pitch angle of the rotor blade from exceeding the minimum pitch angle threshold.

2. The method of claim 1, further comprising:
   calculating, with the controller, the tip speed ratio of the rotor blade.

3. The method of claim 1, further comprising:
   when the pitch angle meets the minimum pitch angle threshold, maintaining, with the actuator, the pitch angle of the rotor blade at the minimum pitch angle threshold.

4. The method of claim 1, wherein determining the minimum pitch angle threshold and comparing the current pitch angle to the minimum pitch angle threshold are performed a plurality of times during the start-up sequence of the wind turbine.

5. The method of claim 1, further comprising:
receiving, with the controller, a signal from a generator speed sensor, the signal being associated with a generator speed of a generator rotatably coupled to the rotor blade.

6. The method of claim 5, wherein adjusting the pitch angle of the rotor blade during the start-up sequence of the wind turbine is based on the generator speed.

7. The method of claim 1, wherein adjusting the pitch angle of the rotor blade during the start-up sequence of the wind turbine is based on a predetermined ramp rate for the generator speed.

8. The method of claim 1, wherein the predetermined ramp rate is a fixed ramp rate.

9. The method of claim 1, wherein adjusting the pitch angle of the rotor blade during the start-up sequence of the wind turbine comprises moving the rotor blade from a feathered position to a power position.

10. A system for controlling a pitch angle of a rotor blade of a wind turbine, the system comprising:
a rotor including a hub and a rotor blade;
an actuator that adjusts the pitch angle of the rotor blade by rotating the rotor blade about a pitch axis relative to the hub; and
a controller communicatively coupled to the actuator, the controller configured to:
control the actuator to adjust the pitch angle of the rotor blade to move the rotor blade during a start-up sequence of the wind turbine;
determine a minimum pitch angle threshold of the rotor blade based on a tip speed ratio of the rotor blade;
compare a current pitch angle of the rotor blade to the minimum pitch angle threshold; and
control, when the pitch angle meets the minimum pitch angle threshold, the actuator to prevent the pitch angle of the rotor blade from exceeding the minimum pitch angle threshold.

11. The system of claim 10, wherein the controller is configured to calculate the tip speed ratio of the rotor blade.

12. The system of claim 10, wherein the controller is configured to control, when the pitch angle meets the minimum pitch angle threshold, the actuator to maintain the pitch angle of the rotor blade at the minimum pitch angle threshold.

13. The system of claim 10, wherein the controller is configured to determine the minimum pitch angle threshold and compare the current pitch angle to the minimum pitch angle threshold a plurality of times during the start-up sequence of the wind turbine.

14. The system of claim 10, further comprising:
a generator speed sensor operatively associated with a generator rotatably coupled to the rotor, wherein the controller is communicatively coupled to the generator speed sensor and configured to receive a signal from the generator speed sensor associated with a generator speed of the generator.

15. The system of claim 14, wherein the controller is configured to control the actuator to adjust the pitch angle of the rotor blade during the start-up sequence of the wind turbine based on the generator speed.

16. The system of claim 10, wherein the controller is configured to control the actuator to adjust the pitch angle of the rotor blade during the start-up sequence of the wind turbine based on a predetermined ramp rate for the generator speed.

17. The system of claim 16, wherein the predetermined ramp rate is a fixed ramp rate.

18. The system of claim 10, wherein the controller is configured to move the rotor blade from a feathered position to a power position during the start-up sequence.

19. A wind turbine, comprising:
a tower;
a nacelle mounted on the tower;
a rotor coupled to the nacelle, the rotor comprising a hub and at least one rotor blade extending from the hub;
an actuator that adjusts the pitch angle of the rotor blade by rotating the rotor blade about a pitch axis relative to the hub; and
a controller communicatively coupled to the actuator, the controller configured to:
control the actuator to adjust the pitch angle of the rotor blade during a start-up sequence of the wind turbine;
determine a minimum pitch angle threshold of the rotor blade based on a tip speed ratio of the rotor blade;
compare a current pitch angle of the rotor blade to the minimum pitch angle threshold; and
when the pitch angle meets the minimum pitch angle threshold, control the actuator to prevent the pitch angle of the rotor blade from exceeding the minimum pitch angle threshold.

20. The wind turbine of claim 19, wherein the controller is configured to control, when the pitch angle meets the minimum pitch angle threshold, the actuator to maintain the pitch angle of the rotor blade at the minimum pitch angle threshold.

* * * * *